Nov. 3, 1970  F. N. KLEIN  3,538,420

INVERTER

Filed Dec. 9, 1968  7 Sheets-Sheet 1

Frank N. Klein,
Inventor.
Koenig, Senniger,
Powers and Leavitt
Attorneys.

United States Patent Office 3,538,420
Patented Nov. 3, 1970

3,538,420
INVERTER
Frank N. Klein, Kenosha, Wis., assignor to Eaton Yale and Towne Inc., Cleveland, Ohio, a corporation of Ohio
Filed Dec. 9, 1968, Ser. No. 782,114
Int. Cl. H02m 7/52, 1/12; H02p 5/38
U.S. Cl. 321—5
12 Claims

ABSTRACT OF THE DISCLOSURE

The inverter disclosed operates in a switching mode and provides A.C. power at a preselectable frequency and at a preselectable voltage by generating a notched waveform in which the widths of the notches may be varied to vary the average energy content of the overall waveform. The variable switching points or edges of the notches are shifted incrementally under the control of digital circuitry.

BACKGROUND OF THE INVENTION

Due to their reliability and relatively low cost, A.C. motors are preferred for many industrial applications. However, in many applications where variable speed was required it has heretofore been impossible to use such motors because of the difficulty in varying their speed of operation. Merely reducing the applied voltage so as to permit large amounts of slip is not generally satisfactory in that large power losses and overheating may result. Various attempts have also been made at operating A.C. motors with power generated by a variable frequency inverter. The source voltage must vary as a function of frequency in order to apply full power to the motor. Providing this voltage variation concurrently with frequency variation has been difficult to achieve.

Among the several objects of the present invention may be noted the provision of a variable frequency inverter in which the effective output voltage can be readily varied; the provision of such appartus in which the output voltage can be varied substantially independently of output frequency; the provision of such an inverter which is efficient in the use of electrical power; the provision of such an inverter providing an output waveform having an easily filtered harmonic content; the provision of such an inverter which responds rapidly to changes in desired output frequency or voltages; the provision of such an inverter which is highly reliable; and the provision of such an inverter which is relatively inexpensive. Other objects and features will be in part apparent and in part pointed out hereinafter.

SUMMARY OF THE INVENTION

Briefly, an inverter of this invention provides A.C. power at a preselectable frequency and a preselectable voltage and includes switching means for applying different discrete voltage levels to at least one output terminal. A control signal is provided having a value which is a function of the preselected A.C. output voltage and means are included for providing a digitally encoded signal which represents that value. A pulsed timing signal is provided which has a frequency which is a function of the preselected A.C. output frequency. The pulses of the timing signal are digital counted up to a predetermined number of pulsations corresponding to at least a predetermined portion of an A.C. output cycle and the count is then repeated thereby to provide a digitally encoded, cyclically repeating signal which represents phase within the predetermined cycle portion. The switching means are triggered to switch the voltage applied to the output terminal from one discrete level to another when coincidence occurs between the two digitally encoded signals. Accordingly, the phase position of the voltage level switching within the cycle portion is varied incrementally as a function of the value of the control signal thereby to obtain the preselected A.C. output voltage.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
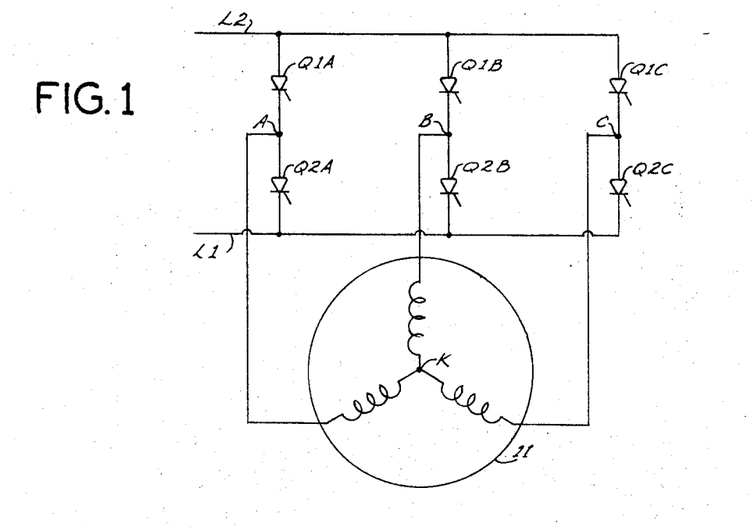
FIG. 1 is a simplified schematic circuit diagram of a basic three-phase inverter power switching circuit.

Referring now to FIG. 1, the inverter power switching circuitry illustrated there in simplified form is adapted to invert or chop D.C. power, supplied through a pair of D.C. supply leads L1 and L2, to provide three-phase A.C. power at three output terminals A, B and C. A suitable load, illustrated as a Y-connected three-phase motor 11, is connected to the output terminals. The common terminal of the Y-connected motor windings is designated K.

Each output terminal A, B and C can be selectively connected either to the positive supply lead L2 through a respective SCR (silicon controlled rectifier) Q1A–C or to the negative supply lead L1 through a respective SCR Q2A–C. It can thus be seen that the SCR's Q1A–C and Q2A–C (or their functional equivalents, such as transistors and thyristors) constitute switching means for applying two different discrete voltage levels to each output terminal. Inverter output circuits of this general type are known in the art and are thus not described in detail herein but are described only briefly for purposes of illustration. Further description of the mode of operation of this type of inverter, including various methods of commutating the SCRs, may be found in the Bedford and Hoft text Principals of Inverter Circuits, particularly Section 7.1 thereof which discusses impulse commutation.

Figure 2:
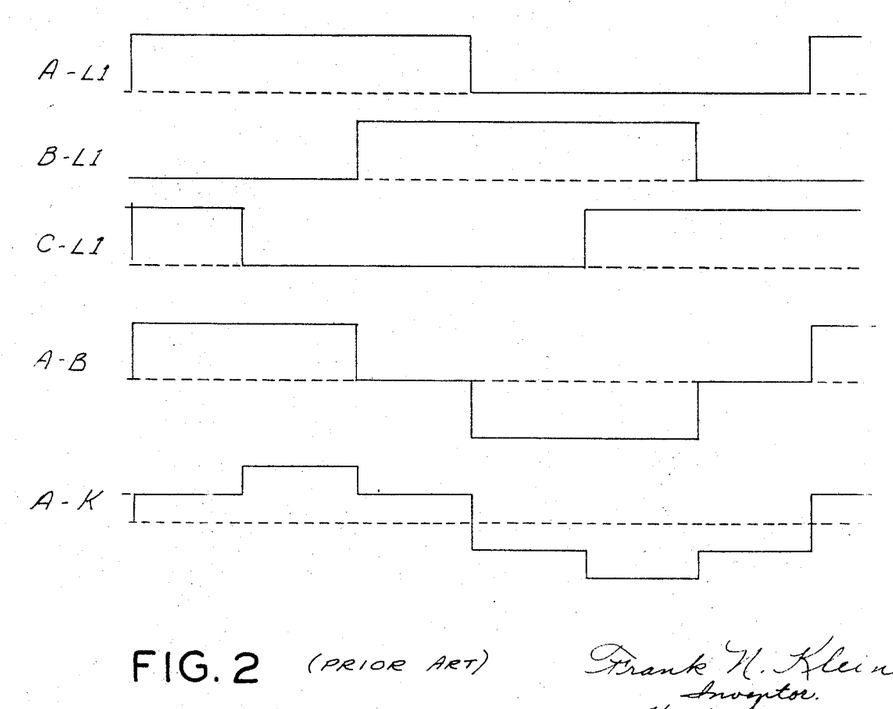
FIG. 2 represents various waveforms which are generated by the circuit of FIG. 1 when it is operated in a manner known in the prior art.

Inverters such as that illustrated in FIG. 1 are typically operated to produce waveforms substantially as represented in FIG. 2. The waveforms provided at the three output terminals A, B and C with respect to lead L1 are represented in the first three lines which are designated A–L1, B–L1 and C–L1. As may be seen, the three waveforms are similar but are phase displaced from each other by 120°. The voltage between a typical pair of output terminals A and B is represented at the line designated A–B. As may be seen, this waveform is only a rough approximation of a sine wave but, as is illustrated at A–K, the waveform applied across each one of the phases of a three-phase load quite closely approximates a sine waveform. This waveform provides reasonably satisfactory operation of a three-phase A.C. motor and, by varying the time of triggering of the various SCR's, the A.-C. output frequency may be varied. However, as will be understood by those skilled in the art, the effective A.C. output voltage will remain substantially constant as the output frequency is varied if the D.C. source voltage is kept constant. Various inverters have been proposed in which a variable D.C. supply voltage is provided to permit adjustment of the A.C. output voltage. However, variable output voltage D.C. power supplies require very heavy capacitive filtering and are thus very slow to respond to voltage changes. Further, substantial power losses are typically incurred in providing D.C. voltage at an adjustable level.

Figure 3:
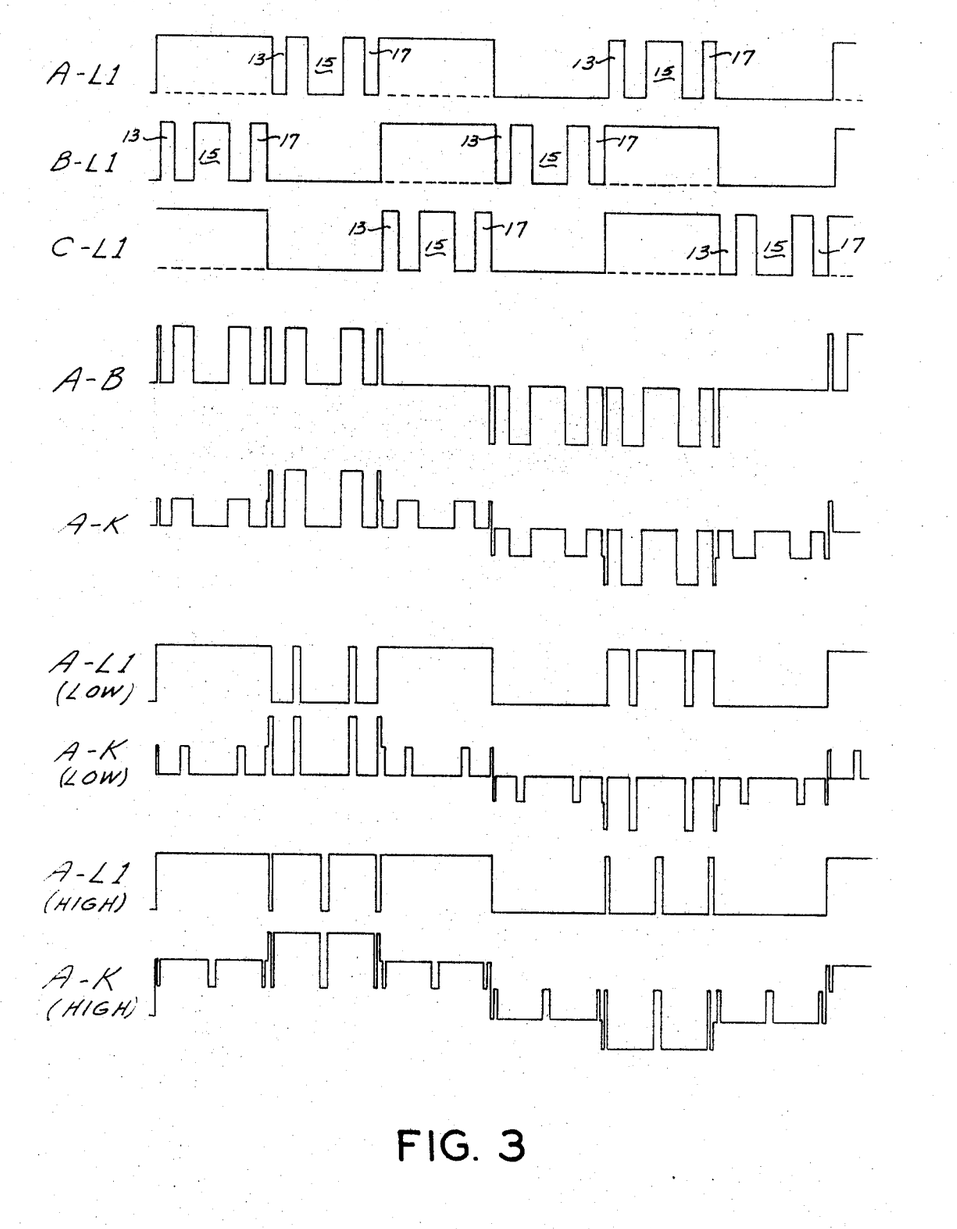
FIG. 3 represents waveforms which can be provided by the circuit of FIG. 1 when controlled by apparatus of the present invention.

In the practice of the present invention a switching type inverter output circuit such as that illustrated in FIG. 1 is operated with suitable timing of the switching events to generate notched waveforms such as those represented in FIG. 3. In FIG. 3 the lines designated A–L1, B–L1 and C–L1 again represent the waveforms generated at the respective three-phase output terminals A, B and C, with respect to the negative supply lead L1. Instead of remaining at each discrete voltage level for an an interval equal to 180 electrical degrees, each half cycle of each waveform includes three notches 13, 15 and 17 which interrupt the continuity of the applied voltage. These notches may all occur in the middle third of each 180 degree segment and each notch is produced by temporarily applying the opposite discrete voltage level from that which dominates during the remaining two-thirds of the respective 180° period. However, the notches may also occur during other segments if desirable. Again, the three waveforms are similar, being displaced in phase 120° from each other.

The net voltage developed between any two terminals is substantially as represented at line A–B of FIG. 3 and the voltage developed across any one phase of Y-connected three-phase load is substantially as represented at line A–K. While the waveform indicated at line A–K of FIG. 3 is relatively complex so that visualization is difficult, it can be shown by mathematical analysis that the average energy content of this waveform quite closely approximates a sine wave distribution.

Further, the low order harmonic content is quite small. Thus, if this waveform is applied to an A.C. motor in unfiltered form, it does not cause appreciable inefficiency of operation due to the momentary application of reverse torque resulting from the presence of certain harmonics and consequent additional heating. The high frequency components can be relatively easily filtered out.

By changing the time base, that is by proportionally varying the rate at which the switching of output voltage levels occurs, the nominal A.C. output frequency may be varied. Further, by varying the widths of the notches 13, 15 and 17, the energy content or effective A.C. output voltage of the waveform A–K can also be varied. As noted previously, the efficient operation of an A.C. motor at different source frequencies requires that the source voltage vary as a function of the output frequency.

Widening the notches 13, 15 and 17 so that each phase provides a waveform such as that represented at A–L1 (LOW) in FIG. 3 causes each phase of a Y-connected load to receive a waveform substantially as represented in line A–K (LOW) in FIG. 3. As may be see, the average energy content of the complex waveform in line A–K (LOW) is substantially less than in the line A–K. In other words, the effective A.C. output voltage is reduced. Conversely, the effect produced by narrowing the notches is represented in lines A–L1 (HIGH) and A–K (HIGH) in FIG. 3. As may also be seen, the resultant composite wavefrom A–K (HIGH) has a relatively high energy content and thus the effective output voltage is increased as compared with line A–K.

The manner in which the widths of the notches 13, 15 and 17 are varied is generally as follows, reference being had to FIG. 4 in which the output waveform A–L1 provided at the output terminal A is represented to an enlarged scale. As noted previously, the notching takes place within the middle third of each half-cycle, that is, within one-sixth of a cycle as indicated on the drawing. Within this one-sixth of a cycle, and as shown on line T of FIG. 4, the initial edge of the notch 13 is designated as switching even O and the trailing edge of the notch 17 is designated as even N. As is explained in greater detail hereinafter, these events are fixed in phase within the cycle. It should be noted that the O and N events are not exactly coincident with the edges of the one-sixth cycle portion but rather occur within the portion. The trailing edge of the notch 13 and the trailing edge of the notch 15 are both designated by the letter M and the leading edge of the notch 15 and the leading edge of the notch 17 are both designated by the letter L.

In varying the widths of the notches 13, 15 and 17, the phasing of the switching event M and L is varied while the O and N events may remain fixed in phase as noted previously. However, certain applications may require varying the phase of events O and N. The notches are narrowed by causing the events designated M to occur earlier in each cycle, that is, to move to the left as seen in lines A–L1 and T in FIG. 4, and by causing the events designated L to occur later in phase, that is, to move to the right as seen in FIG. 4. Shifts in the respective opposite directions are employed to widen the notches.

Figure 4:
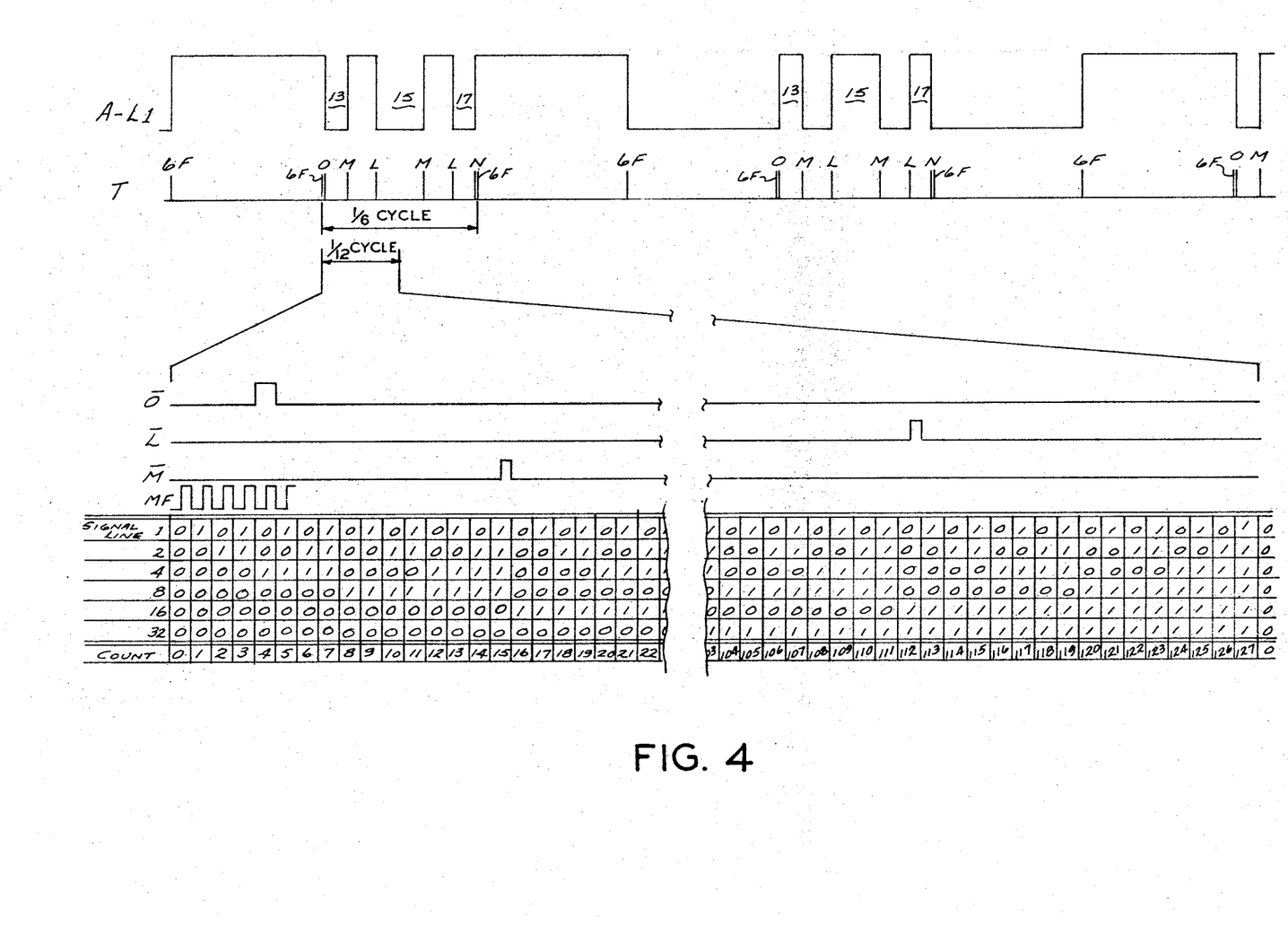
FIG. 4 is a timing diagram illustrating the operation of apparatus of this invention.
Figure 5:
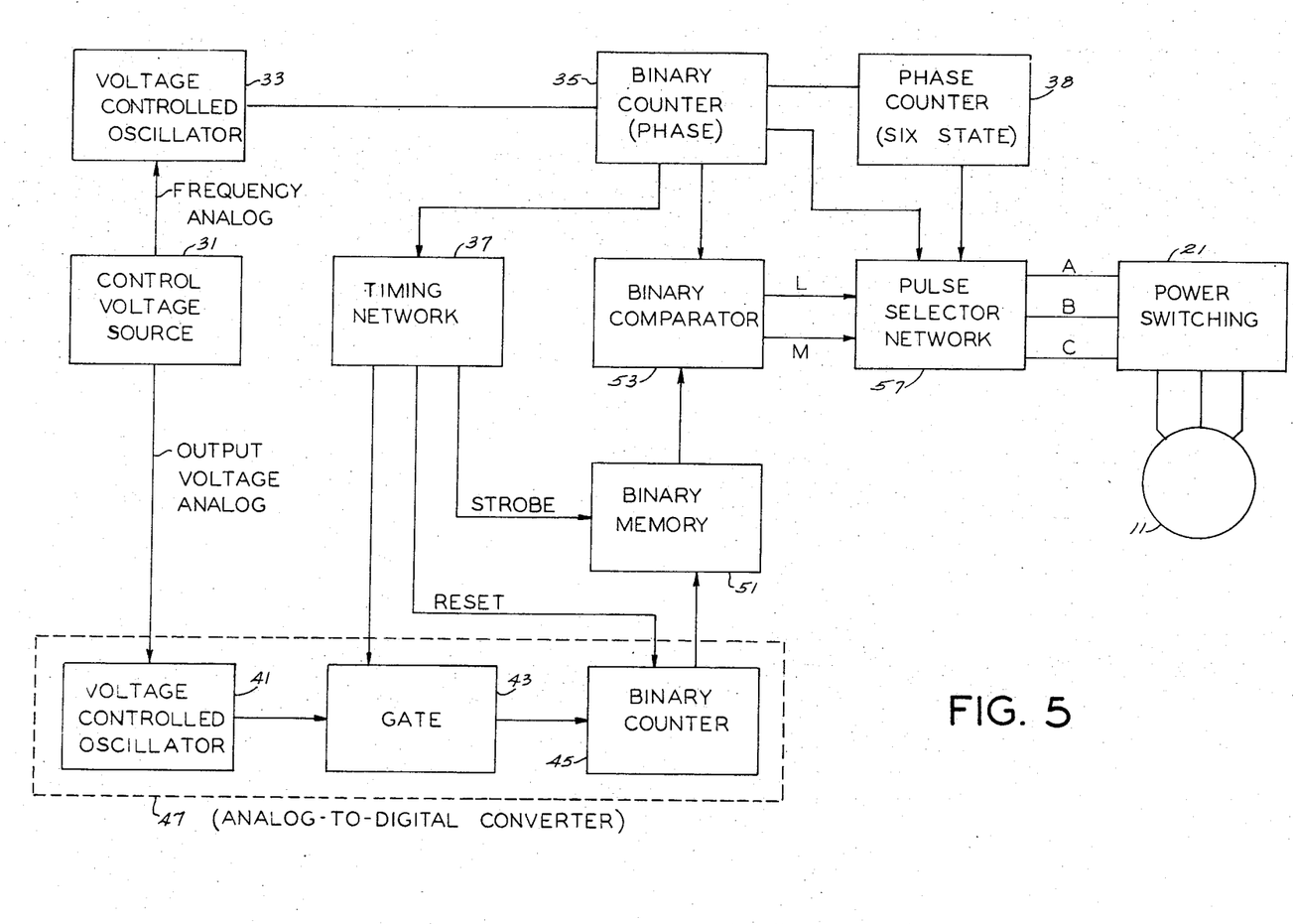
FIG. 5 is a block diagram of inverter apparatus of this invention.

In the practice of the present invention, the variable positioning of these notch edges or switching events is precisely controlled by digital logic circuitry of the type shown in FIG. 5. The block diagram of FIG. 5 illustrates a variable speed A.C. motor drive employing an inverter which provides A.C. power at a preselectable frequency and a preselectable effective output voltage using the pulse width variation method just described with reference to FIGS. 3 and 4. A power switching circuit is indicated at 21. This switching circuit may be of the type illustrated generally in FIG. 1 although a transistor or other switching device output stage may also be used. The switching circuit drives the A.C. motor 11. However, other single or multiphase loads different from an A.C. motor may be employed.

A control voltage source indicated generally at 31 provides a pair of D.C. voltage signals one of which represents or is an analog of the preselected A.C. output frequency and the other of which represents or is an analog of the preselected A.C. output voltage. As is understood by those skilled in the art, the optimum voltage which should be applied to an A.C. motor for efficient operation does not always vary in direct proportion to the frequency. Accordingly, it is desirable that the A.C. output frequency and the A.C. output voltage be independently preselectable, e.g. by means of respective control voltages as in the apparatus illustrated.

The control voltage representing frequency is applied to a voltage controlled oscillator 33 to provide a pulsed timing signal having a frequency which is a function of the preselected A.C. output frequency. The timing signal, in fact, has a frequency which is a large multiple of the preselected output frequency. In the example illustrated, oscillator 33 provides an output signal at a frequency which is 1536 ($3 \times 2^9$) times the inverter output frequency. Oscillator 33 is preferably of the highly linearized type customarily employed in precision analog-to-digital converters. One such oscillator is described in the Fairchild Semiconductor Linear Integrated Circuits Applications Handbook edited by James N. Giles.

A binary counter 35 counts down from the relatively high frequency provided by oscillator 33 to provide a signal at a frequency which is six times the preselected inverter output frequency. The counter also provides a series of signals at intermediate frequencies, one for each binary power. These signals, taken together, constitute a digitally encoded, cyclically repeating signal which represents phase within a corresponding cycle portion (e.g., one-sixth) of the inverter's output cycle. In other words, the binary counter 35 acts as a sort of clock which determines phase within a predetermined portion of the inverter's cycle of operation. It should be noted that the binary count provided by counter 35 represents phase as contrasted with time since the frequency of the oscillator 33 varies in proportion to the preselected output frequency of the inverter.

The signals provided by counter 35 are provided to a timing pulse generating network 37 which combines these signals, as described in greater detail hereinafter, to provide various timing signals which initiate or control operational events which occur at fixed times within each inverter cycle.

A signal having a frequency of six times the preselected inverter output frequency is also applied to a six-state phase counter 38 which is employed in producing the desired sequence of operation of the different phases as will be apparent hereinafter. Other than three-phase systems may require other multiples of the output frequency at the various parts in the block diagram.

The second D.C. control voltage, that is the control voltage which represents the preselected A.C. output voltage, is applied to a second voltage controlled oscillator 41 which may be a highly linearized oscillator essentially identical to the oscillator 33. The output signal from oscillator 41 is thus a pulsed signal having a frequency which is proportional to or varies as a function of the value of the respective control signal. The pulsed output signal from oscillator 41 is passed through a gate 43 which is opened for a predetermined interval at predetermined times within each output cycle of the inverter. Those pulses which are generated by oscillator 41 and passed by gate 43 are applied to a second binary counter 45. Since the gate 43 is opened for a predetermined time interval, the counter 45 is advanced by a number which is a function of or proportional to the output frequency of oscillator 41. The count is also thus proportional to the value of the control signal applied from source 31 to the oscillator 41. As will be understood by those skilled in the art, the voltage controlled oscillator 41, the gate 43 and the counter 45 together constitute an analog-to-digital converter, designated 47, which provides a digitally encoded signal representing the value of the voltage preselecting control signal.

The digitally encoded signal provided by counter 45 is applied to a binary memory circuit 51 and, at predetermined times within each inverter cycle, the memory is updated by the application of a so-called strobe signal provided by the timing pulse generating network 37 to accept the current count held by the counter 45. In other words, the count held by the counter 45 is periodically read into the memory 51. Immediately after the count held by the counter 45 is read into the memory 51, the counter is reset under the control of the timing network 37 preparatory to a reopening of the gate 43 to admit another sample of the oscillator output signal for analog-to-digital conversion.

A binary comparator circuit 53 compares the cyclically repeating count provided by counter 35 with the count stored in the memory 51. Comparator circuit 53 is operative to provide a respective output signal when there is coincidence or anticoincidence between the two binary signals applied thereto. Since the count obtained from the counter 35 is cyclically repeating, it will be understood by those skilled in the art that the time or phase within each inverter output cycle portion at which coincidence or anticoincidence occurs will depend upon the count held in the memory 51. For example, taking the case of coincidence, the point of coincidence will occur late in the cycle portion if the memory 51 holds a relatively large number and will ocur at an early point in the cycle portion if the memory 51 holds a relatively low number. It can thus be seen that the phase at which the coincidence signal occurs is variable as a function of the value of the control signal applied to the analog-to-digital converter 47 by source 31. The phase of the anticoincidence signal varies with the control signal value in complementary fashion, that is, anticoincidence occurs earlier within the cycle portion for larger number and later for smaller number stored in memory 51.

Comparator 53 can thus be seen to provide a pair of signals which shift in phase or time within the respective cycle portion as a function of the value of a control signal. These signals then are employed respectively to define or time the L and M variable switching events described earlier with reference to FIG. 4.

As noted previously, the notching which occurs during each half-cycle is concentrated in the middle one-third of each half-cycle, that is, within a one-sixth cycle portion. Further, the variable switching events L and M each repeat within each one-sixth cycle portion. It will be understood, however, by those who are skilled in the art that events L and M may each repeat within a cycle portion other than one-sixth depending on the design and application of the system.

As may be seen by reference to lines A–L1, B–L1 and C–L1 of FIG. 3, the M and L timing signals are needed by one or another of the phases during each successive one-sixth cycle portion of the inverter output cycle. A pulse selector network 57 controlled by the phase counter 38 distributes the switching event timing signals to the different output phases to obtain the desired sequence and polarity of switching.

Appropriately timed control pulses passed by the selector network 57 are then employed by the power switching circuit 21 to execute the necessary switching of voltage levels at the varous output terminals A, B and C thereby to provide the desired waveforms as illustrated in FIG. 3, the effective A.C. output voltage being variable by varying the phasing of selected switching events. Although the output voltage is variable, the inverter still operates in a switching mode so that it is efficient in its use of electric power.

Particular logic circuitry for providing the timing and sequencing of the switching events according to the present invention is illustrated in FIGS. 5–11, the various logic components being represented symbolically in conventional manner with positive logic being assumed. The various gate, flip-flop, counter and multivibrator functions thusly represented are preferably provided using so-called integrated circuits. By using integrated circuits, a control according to the present invention, though relatively complicated in detail function, may be constructed to be reliable, compact and of relatively low cost.

Figure 6:
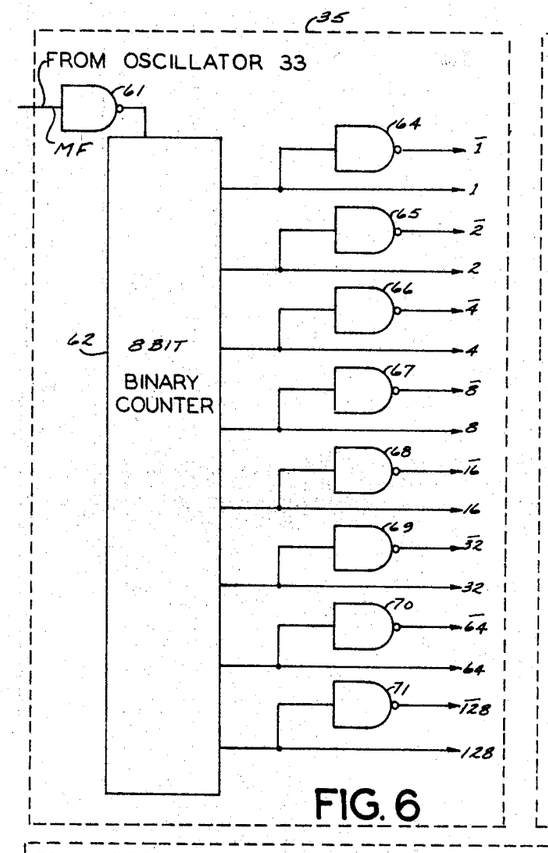
FIGS. 6–11 are detailed logic diagrams of various components indicated generally in the block diagram of FIG. 5. These figures respectively illustrate: a counter; a timing network; a gate; a binary counter, memory and comparator; a phase counter; and a pulse selection network.
Figure 7:
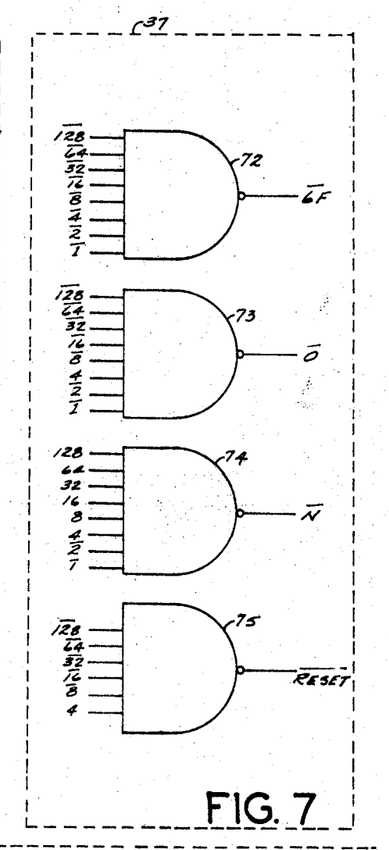

Referring to FIG. 6, the signal from the oscillator 33, designated the MF signal, is applied, through a NAND gate 61, to an eight bit binary counter 62 to provide signals designated 1, 2, 4 . . . 64 and 128. These signals are square wave signals which are related in frequency to the oscillator signal by powers of two, e.g., the 1 signal executes one cycle for every two cycles of the oscillator signal, the 4 signal executes one cycle for every eight cycles of the oscillator signal, and so on. Each of these signals is also applied to a respective NAND gate 64–71 to obtain its binary complement $\bar{1}, \bar{2} \ldots \bar{64}$ and $\overline{128}$.

The timing signals obtained from counter 35 are combined in NAND gates 72–75 (FIG. 7) in various combinations as designated in the drawing to obtain timing signals which control various events which are fixed in phase within each inverter cycle. This group of gates constitutes the timing pulse network 37. The first signal obtained is the $\overline{6F}$ pulse signal which defines the start of each one-sixth cycle portion. The $\bar{O}$ and $\bar{N}$ signals which control the O and N switching events are generated in similar manner. In FIG. 4, the lower portions of the drawing are on an expanded time scale, as indicated on the drawing, such that the full width of each line corresponds to the one-twelfth cycle portion which comprises the first half of the one-sixth cycle portion in which notching occurs. The line designated $\bar{O}$ in FIG. 4 represents the occurrence of the $\bar{O}$ signal within the one-twelfth cycle portion. As will be understood by those skilled in the digital logic arts from the particular signals combined, the $\bar{O}$ pulse occurs four counts after the 6F pulse and the $\bar{N}$ pulse signal occurs four counts before each 6F pulse, the counting being based on the MF signal (FIG. 4) as the unit count so that there are 1536 counts per output cycle or 128 counts per one-twelfth cycle as indicated on the binary table at the bottom of FIG. 4. The gate 75 generates the $\overline{RESET}$ signal which resets the counter 45 within each one-sixth cycle portion.

Figure 8:
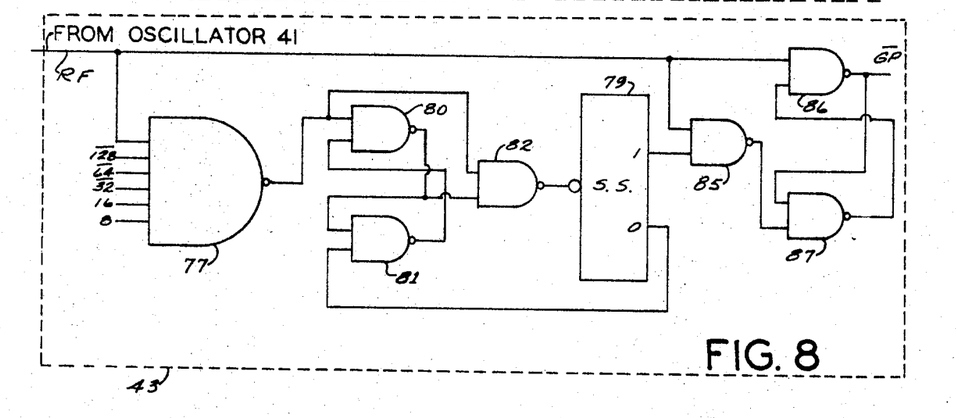

The detailed construction of the gate 43 is illustrated in FIG. 8. Various timing signals are combined in a NAND gate 77 with the signal from the oscillator 41, designated RF, so that, within a given range of phase angles, the pulsations of the signal from oscillator 41 will appear in the output of gate 77. The first negative-going portion of the output signal from gate 77 triggers an R-S flip-flop made up of NAND gates 80 and 81. This flip-flop controls a NAND gate 82 so that, once the flip-flop is triggered, the next positive-going portion of the signal from gate 77 is passed by the gate 82 (in inverted form) and triggers a single shot multivibrator 79. The multivibrator 79 is thus triggered at the start of an oscillator cycle. Once triggered, the multivibrator remains in its unstable state for a preselected time interval as is understood by those skilled in the art. The complemented output signal from the multivibrator 79 is applied back to the gate 81 to reset the R-S flip-flop at the end of the multivibrator timed interval.

Multivibrator 79 also controls a NAND gate 85 which selectively passes (in inverted form) the output signal provided by oscillator 41 to an R-S flip-flop comprising a pair of NAND gates 86 and 87. The oscillator signal in the noninverted form is applied to the other input of the flip-flop with the result that the flip-flop is toggled between its two states at the oscillator frequency for the operating period of the single-shot multivibrator. As the flip-flop comprising gates 86 and 87 is set by the gated oscillator signal and is reset by the ungated oscillator signal and as the multivibrator which controls the gating is triggered at the start of an oscillator cycle, it will be understood by those skilled in the art that the output signal provided by the flip-flop, which is designated the $\overline{GP}$ signal, comprises an integral number of whole pulses at the oscillator frequency, that is, each of the pulses is of full duration.

Figure 9:
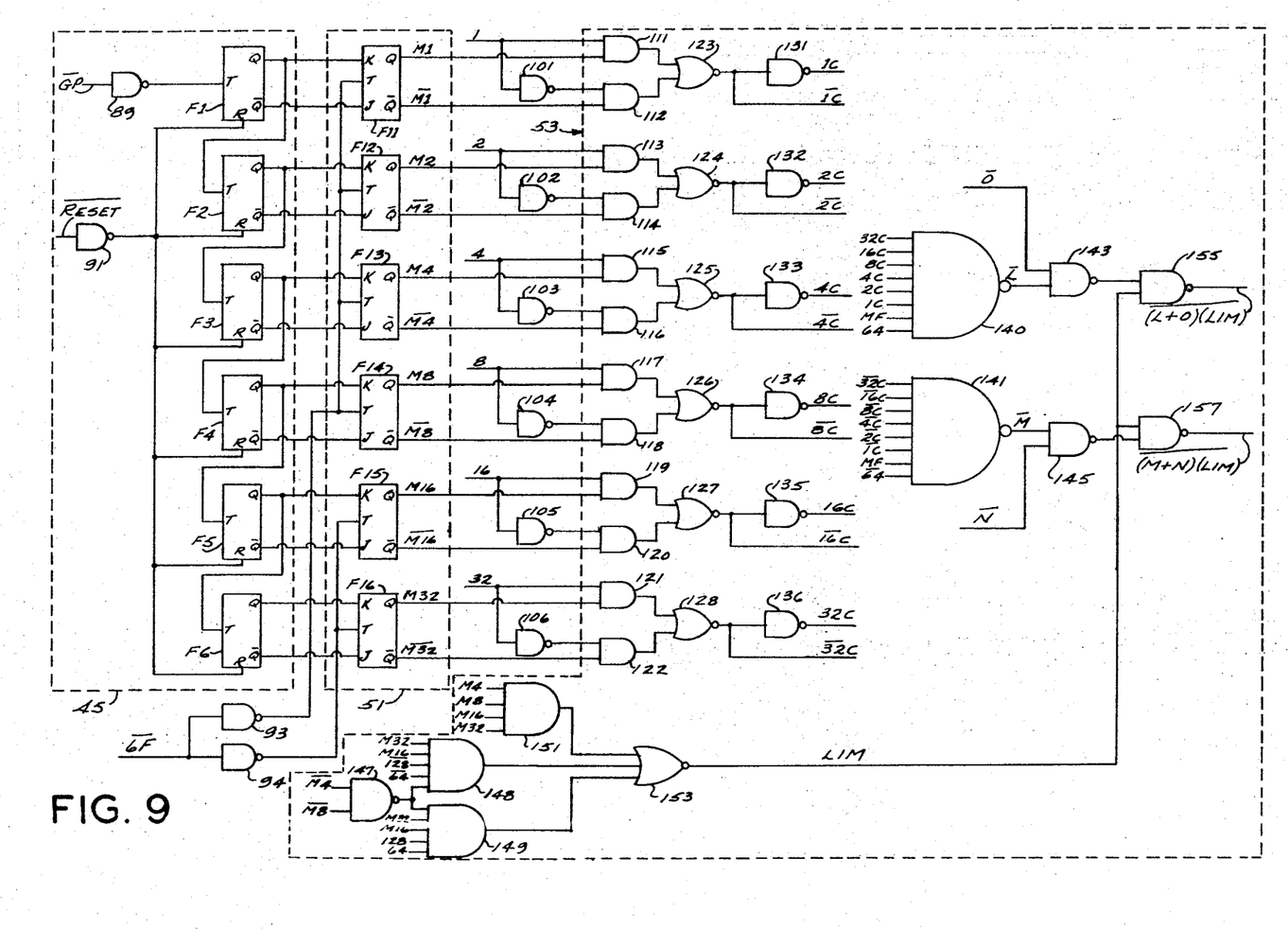

Referring to FIG. 9, the gated pulse signal $\overline{GP}$ is applied, through a NAND gate 89, to the first of six trigger-type flip-flops F1–F6 which comprise the binary counter 45. The $\overline{RESET}$ signal is applied, through a NAND gate 91, to the reset terminals of these flip-flops. The digitally encoded count provided by the flip-flops F1–F6 is applied to the memory 51 which comprises six flip-flops F11–F16 of the so-called J–K type. The $\overline{6F}$ signal is applied, through a pair of NAND gates 93 and 94, to the trigger or transfer terminals of the J–K flip-flops F11–F16 to act as a so-called strobe signal to effect a reading in of information from the counter 45 into the memory 51.

The output signals M1, M2 ... M32 representing the respective bits of the number stored in memory 51, together with their complements $\overline{M1}, \overline{M2} ... \overline{M32}$, are applied to the comparator 53 together with the cyclically repeating, binary coded signals 1, 2 ... 32 generated by the counter 35. The complements of these latter signals are also provided to the comparator 53 by means of respective NAND gates 101–106. Comparator 53 includes a network of AND gates 111–112, NOR gates 123–128 and NAND gates 131–136 which determine on a bit-by-bit basis whether coincidence or anticoincidence occurs between the counts held by counter 35 and memory 51. The signals produced by the occurrence of coincidences in individual bits, designated 1C, 2C, etc., are combined in a NAND gate 140 together with the MF and 64 signals from the oscillator 33 and the counter 35 respectively to provide the signal indicating overall coincidence, designated the $\bar{L}$ signal. Similarly, the signals produced by the occurrence of anticoincidences in the individual bits, designated $\overline{1C}, \overline{2C}$, etc., are combined in a NAND gate 141 together with the MF and $\overline{64}$ signals to produce a signal designated the $\bar{M}$ signal which indicates overall anticoincidence.

The operation of this apparatus to provide $\bar{L}$ and $\bar{M}$ event timing pulses respectively when coincidence and anticoincidence occur and to thereby permit shifting of these events in phase can be understood with reference to the binary table in FIG. 4. This binary table represents the states through which the output signals 1, 2, 4 ... 32 from the counter 35 pass during a one-twelfth cycle portion of an inverter cycle. As the counting is based on a frequency of 1536 times the inverter output frequency, the one-twelfth cycle portion requires a count of 128, as illustrated. Since the most significant binary digit signal supplied to the network of AND gates is the 32 signal, it will be understood by those skilled in the art that the binary signal pattern will repeat itself once within the count of 128.

In the example illustrated in FIG. 4, it is assumed that the memory 51 has been set to a count of 48, i.e. binary 110000, in response to the particular value of the voltage control signal provided by source 31. Accordingly, when the cyclically repeating counter 35 gets up to a binary count of 15, i.e. 001111 binary, the comparator 53 will indicate anticoincidence. As the gate 140 includes inputs not only from the comparator 53 but also the signal MF from oscillator 33 which operates at a frequency of 1536 times the inverter output frequency, the $\bar{M}$ signal will in fact not be generated until half a count after coincidence occurs, as indicated on the line designated $\bar{M}$ in FIG. 4.

When counter 35 reaches a count of either 48 or 112, the binary representation, since only six significant binary digits are represented, will be 110000 and thus coincidence will be indicated. The inclusion of the 64 signal as one of the inputs to the NAND gate 140 and the $\overline{64}$ signal as one of the inputs to the NAND gate 141 prevents the generation of the $\bar{L}$ signal during the first half of the one-twelfth cycle portion, e.g., at the count of 48, and prevents the generation of the $\bar{M}$ signal during the second half, even though the binary pattern of the signals 1, 2 4 ... 32 repeats within the one-twelfth cycle portion. As the gate 141 also includes an input (MF) from the oscillator 33, the actual generation of the $\bar{L}$ pulse is also delayed by half a count as was the generation of the $\bar{M}$ pulse. As will be understood by those skilled in the art, the $\bar{O}$, $\bar{L}$ and $\bar{M}$ signals will in fact be negative-going pulses if positive logic is employed as indicated previously.

By inspecting FIG. 4 it can be seen that the $\bar{M}$ and $\bar{L}$ pulses are symmetrically disposed within the one-twelfth cycle portion. Similarly, it can be seen that, if the count which is preset or held in the memory 51 is varied, and the $\bar{L}$ and $\bar{M}$ pulses will move in opposite directions within the one-twelfth cycle portion. For example, if the memory is preset to 49, i.e. 110001 binary, The $\bar{M}$ signal will occur one count earlier, i.e., at 001110 binary, and the $\bar{L}$ signal will occur one count later, i.e. at 110001 binary. It can thus be seen that events controlled by these pulses will shift phase incrementally in complementary fashion within an inverter cycle in response to changes in the value of the control signal voltage which, through the analog-to-digital converter 47, presets the number held by the memory 51.

The $\bar{M}$ and $\bar{L}$ signals control the phasing of the various notch edges as indicated in the upper part of FIG. 4. Thus, by varying the phasing of these two signals, the widths of the notches can be selectively varied to vary the effective A.C. output voltage in the manner discussed previously with reference to FIG. 3. By considering the direction of phase change of the different switching events with respect to changes in the number held in memory 51, it can be seen that the widths of the notches 13, 15 and 17 decrease as the number stored in the memory 51 increases. Thus, an increase in the number stored in memory 51 produces an increase in the effective A.C. output voltage.

It is desirable to completely eliminate a notch if its width falls below a certain level so as to reduce the number of switching operations. The logic circuitry shown at the bottom in FIG. 9 employs the memory information to stop the notching according to a predetermined program as the number stored in memory 51 increases.

The NAND gate 147 and the AND gates 148 and 149 combine memory information and phase information obtained from counter 35 in such a way that an output signal is obtained from gate 148 during in interval spanning the period of the first notch 13 if the number stored in memory 51 is above 52. Similarly the gate 149 provides an output signal during an interval spanning the period of the third notch 15 if the number stored in memory 51 is above 52. A NAND gate 151 combines memory information to provide a continuous output signal if the number in the memory exceeds 60. The output signals from the gates 148, 149 and 151 are combined in a NOR gate 153 to provide a signal designated the LIM signal.

The $\overline{L}$ and $\overline{O}$ signals are combined in a NAND gate 143. It will be noed that the L and O switching events are in the same direction or polarity in any given one-sixth cycle period. Similarly, the $\overline{M}$ and $\overline{N}$ signals are combined in a NAND gate 145, these signals corresponding to switching events of the opposite polarity in the same one-sixth cycle period. The LIM signal controls a pair of NAND gates 155 and 157 which selectively gate the signals obtained from the gates 143 and 145 respectively, the output from gates 155 and 157 being logically designated the $$\overline{(L+O)(LIM)} \text{ and } \overline{(M+N)(LIM)}$$

signals respectively.

As the $\overline{L}$, $\overline{O}$, $\overline{M}$ and $\overline{N}$ signals control the switching events which produce the notching, it can be seen that blocking these signals under the control of the LIM signal will eliminate the notching. In particular, the two smaller notches 13 and 17 will be eliminated if the number stored in memory 51 exceeds 52 and all of the notches will be eliminated if the number in the memory exceeds 60. The elimination of notches raises the effective A.C. output voltage while reducing the number of voltage swtichings which is highly desirable to obtain maximum voltage while minimizing losses.

Figures 10, 11:
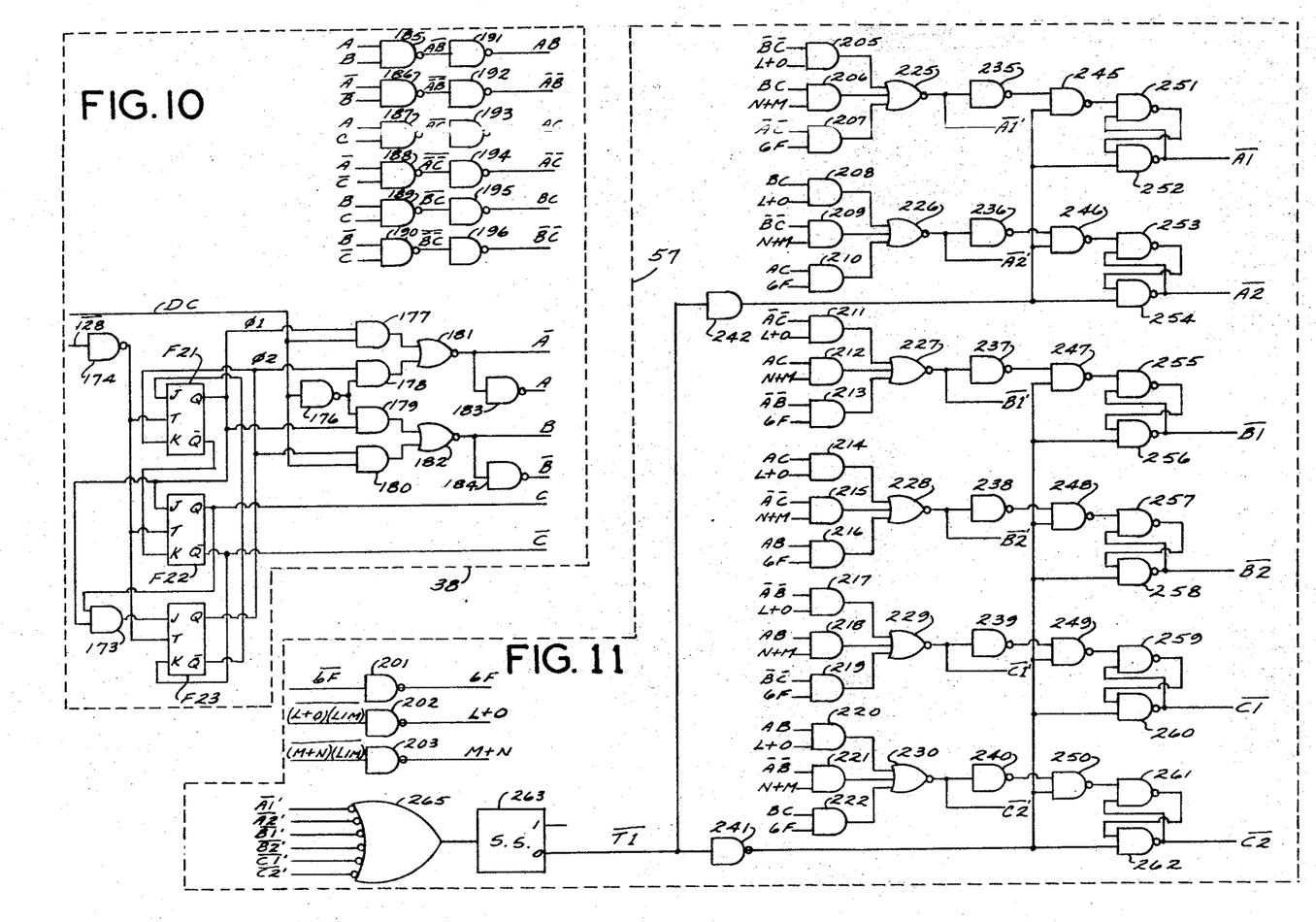

The logic circuitry just described with reference to FIGS. 6–9 is operative to provide suitably phased signals for controlling power switching within a one-twelfth cycle portion of the desired waveform as described with reference to FIGS. 3 and 4. The logic circuitry illustrated in FIGS. 10 and 11 is operative to select and distribute these timing signals to the different phases and to select the appropraite direction of switching in each half-cycle of each phase. The six-state phase counter 38 comprises three J–K flip-flops F21–F23 and an AND gate 173. The counter counts the pulsations of the $\overline{128}$ signal which is applied thereto through a NAND gate 174. As the counter 38 runs in one direction only, reversing is provided by a network of gates 176–182 which are interconnected to function as a double-pole, double-throw switch under control of a direction control signal designated DC which may be provided from any appropriate source. This network determines which of a pair of signals $\phi1$ and $\phi2$ obtained from the flip-flops F21–F23 is provided at each of a pair of signal leads, designated $\overline{A}$ and $\overline{B}$ respectively. As is understood by those skilled in the art, the interchanging of two phases in a three-phase inevter will cause a motor driven therefrom to reverse its direction of rotation. The $\overline{A}$ and $\overline{B}$ signals are also provided in reinverted form as A and B signals by means of a pair of NAND gates 183 and 184. The C and $\overline{C}$ signals are provided directly from the flip-flops F21–F23. The A, B and C signals and their respective complements are combined in a network of NAND gates 185–196 to provide a series of signals each of which represents or corresponds to a one-sixth portion of an A.C. output cycle and also the complement of each such signal, the designation of each of these signals being given in conventional Boolean logic form on the drawing.

The signals which determine the timing of the switching events, that is the $\overline{6F}$, the $\overline{(L+O)(LIM)}$ and the $\overline{(M+N)(LIM)}$ signals, are provided in noninverted form by means of NAND gates 201–203. These noninverted signals are designated the 6F, $L+O$ and $M+N$ signals, the LIM portion of the proper Boolean expression being omitted for simplification in the drawing of the selection network 57. The selection of the different timing signals for each phase under control of the phase signals is provided by a matrix of AND gates 205–222 which, in groups of three, feed NOR gates 225–230, the various signals being applied to the gates in combinations as designated in the drawing. The timing signals are, in effect, selectively passed to the different output phases under the control of the signals generated by the phase counter 38.

The signals obtained from the NOR gates 225–230 (all of which carry prime designations) are not of uniform duration. To obtain pulses of predetemined duration which are more easily utilized, the output signals from the NOR gates 225–230 are inverted by means of respective NAND gates 235–240 and are applied, through respective NAND gates 245–250, to respective R–S flip-flops each of which comprises a pair of NAND gates 251–262, appropriately interconnected. The output signals from the NOR gates 225–230 are also applied to a single shot multivibrator 263 through an OR gate 265 having inverting input terminals so that the multivibrator is triggered by any one of these output signals. The single shot multivibrator 263 provides a timed output signal $\overline{T1}$ which is inverted in NAND gates 241 and 242 and combined with the respective inverted NOR gate output signal in each of the NAND gates 245–250. Accordingly, when an output signal is provided by one of the NOR gates 225–230, it causes the respective R–S flip-flop to be set. Then, a predetermined time interval later, the flip-flop is reset by the $\overline{T1}$ signal. As is understood by those skilled in the art, this logic circuitry is thus operative to provide a pulse of fixed length whether the initiating pulse is longer or shorter than the desired output pulse length determined by the single shot multivibrator 263. The R-S flip-flops then provide pulse signals which are of predetermined duration and which occur at each of the desired switching points. These signals are designated $\overline{A1}$, $\overline{A2}$, $\overline{B1}$ etc.

The two A signals control the A phase. The $\overline{A1}$ signal or pulse occurs each time the output voltage at terminal A (FIG. 1) is to switch in the positive direction and the output signal $\overline{A2}$ occurs each time the voltage at that output terminal is to switch in the negative direction. These signals may, for example, be employed to control the alternate triggering of the power switching SCR's Q1A, Q2A for the A phase as illustrated in FIG. 1, suitable commutation of the SCR's being provided as is understood by those skilled in the art as discussed previously.

If a transistor power switching output stage is to be used, the two timing pulse signals for each phase can be applied to respective inputs of an R-S flip-flop so that the flip-flop is repeatedly triggered between its two states. The R-S flip-flop will then provide an output waveform which is substantially the same as the respective desired output voltage waveform, e.g., A–L1, B–L1, and C–L1 of FIG. 3, and these waveforms may then be amplified to any desired power level. As the present invention relates to the system of varying the width of notches in a waveform rather than to power switching circuitry, specific power switching circuitry is not shown, such circuitry being well known as noted previously.

The particular notching pattern or program which has been illustrated is preferred in that it can be very effective in reducing certain objectionable frequency-harmonics, particularly the fifth and seventh harmonics when system is used on a motor load. Further, the use of this notching program simplifies the selection or distribution of the timing pulses to the different phases since the notching for any one phase occurs in one-sixth cycle intervals during which none of the other phases require notching. However, many other notching patterns will be apparent to those skilled in the art and it should be understood that the notch width varying apparatus of the present invention can be used to control the effective output voltage with such other notched waveforms as well as with the one illustrated.

An advantage of this system of voltage control, whatever notching program is used, is that the system will respond extremely rapidly to changes in the desired output voltage. In fact, the system as illustrated will start to respond in considerably less than the period of one output cycle since the number contained in the memory 51 is updated once every one-sixth of a cycle. As soon as the memory is updated to reflect a change in the desired output voltage, all notches occurring thereafter will automatically be of the proper width to produce a composite output waveform having the newly desired effective A.C. voltage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an inverter for providing an A.C. power output at a preselectable frequency and a preselectable voltage, voltage control apparatus comprising:
   at least one output terminal;
   switching means for aplying different discrete voltage levels to said output terminal;
   means for providing a control signal having a value which is a function of the preselected A.C. output voltage;
   means for providing a digitally encoded signal which represents said value;
   means for providing a pulsed timing signal having a frequency which is a function of the preselected A.C. output frequency;
   means for digitally counting the pulses of said timing signal up to a predetermined number of pulsations corresponding to at least a predetermined portion of an A.C. output cycle and then repeating said count thereby to provide a digitally encoded, cycically repeating signal which represents phase within said predetermined cycle portion; and
   means for triggering said switching means to switch the voltage applied to said output terminal from one discrete level to another when coincidence occurs between said digitally encoded signals whereby the phase of the voltage level switching within said cycle portion is varied incrementally as a function of the value of said control signal thereby to obtain the preselected A.C. output voltage.

2. Apparatus as set forth in claim 1 wherein said means for providing a digitally encoded signal which represents the value of said control signal comprises a binary counter, an oscillator providing an output signal having a frequency which varies as a function of the value of said control signal, and a gate for applying said oscillator output signal to said binary counter for a predetermined time interval.

3. Apparatus as set forth in claim 2 wherein said gate includes a single shot multivibrator for determining said time interval.

4. Apparatus as set forth in claim 2 including means for resetting said binary counter during each cycle portion.

5. Apparatus as set forth in claim 2 including a binary memory into which said digitally encoded signal representing the value of said control signal is transferred for comparison with said digitally encoded, cyclically repeating signal which represents phase.

6. In an inverter which provides an A.C. power output at a preselectable frequency and a preselectable voltage by generating a notched waveform, the effective output voltage being variable by varying the phasing of at least one notch edge, voltage control apparatus comprising:
   at least one output terminal;
   switching means for applying different discrete voltage levels to said output terminal;
   means for providing a control signal having a value which is a function of the preselected A.C. output voltage;
   means for providing a digitally encoded signal which represents said value;
   means for providing a pulsed timing signal having a frequency which is a function of the preselected A.C. output frequency;
   means for digitally counting the pulses of said timing signal up to a predetermined number of pulsations corresponding to at least a predetermined portion of an A.C. output cycle and then repeating said count thereby to provide a digitally encoded, cyclically repeating signal which represents phase within said predetermined cycle portion; and
   means for triggering said switching means to generate said one notch edge when coincidence occurs between said digitally encoded signals whereby the phase of said one notch edge within said cycle portion is varied by increments as a function of the value of said control signal thereby to obtain said preselected A.C. output voltage.

7. In an inverter which provides an A.C. power output at a preselectable frequency and a preselectable voltage by generating a notched waveform, the effective output voltage being variable by varying the phasing of at least two notch edges, voltage control apparatus comprising:
   at least one output terminal;
   switching means for applying different discrete voltage levels to said output terminal;
   means for providing a control signal having a value which is a function of the preselected A.C. output voltage;
   means for providing a digitally encoded signal which represents said value;
   means for providing a pulsed timing signal having a frequency which is a function of the preselected A.C. output frequency;
   means for digitally counting the pulses of said timing signal up to a predetermined number of pulsations corresponding to at least a predetermined portion of an A.C. output cycle and then repeating said count thereby to provide a digitally encoded, cyclically repeating signal which represents phase within said predetermined cycle portion; and
   means for triggering said switching means to generate one of said notch edges when coincidence occurs between said digitally encoded signals and for triggering said switching means to generate the other of said two notch edges when anticoincidence occurs between said digitally encoded signals whereby the phases of said notch edges within said cycle portion are varied oppositely by increments as a function of the value of said control signal thereby to obtain said preselected A.C. output voltage.

8. Apparatus as set forth in claim 7 wherein said inverter provides three-phase power and wherein said voltage control apparatus includes a phase counter and a plurality of gates controlled by said phase counter for selecting which output phase is operative during each cycle portion.

9. Apparatus as set forth in claim 7 wherein said means for providing a pulsed timing signal comprises a variable frequency oscillator.

10. Apparatus as set forth in claim 7 including means for terminating notching of said waveform when said digitally encoded signal representing the value of said control signal exceeds a predetermined number.

11. In an inverter which provides an A.C. power output at a preselectable frequency and a preselectable voltage by generating a notched waveform, the effective output voltage being variable by varying the phasing of at least two notch edges, voltage control apparatus comprising:
  at least one output terminal;
  switching means for applying different discrete voltage levels to said output terminal;
  means for providing a control signal having a voltage which is a function of the preselected A.C. output voltage;
  a voltage controlled oscillator responsive to said control signal to provide an output signal having a frequency which varies as a function of said preselectable output voltage;
  a digital counter;
  gate means for applying the oscillator output signal to said counter for a predetermined time interval during each cycle portion;
  a digital memory;
  means for transferring the number accumulated in said counter to said memory at the start of each cycle portion;
  means for resetting said digital counter after the number accumulated therein is transferred to said memory;
  means for providing a pulsed timing signal having a frequency which is a function of the preselected A.C. output frequency;
  means for digitally counting the pulses of said timing signal up to a predetermined number of pulsations corresponding to at least a predetermined portion of an A.C. output cycle and then repeating said count thereby to provide a digitally encoded, cyclically repeating signal which represents phase within said predetermined cycle portion; and
  comparator means for triggering said switching means to generate one of said notch edges when coincidence occurs between said digitally encoded, cyclically repeating signal and the number held in said memory and for triggering said switching means to generate the other of said two notch edges when anticoincidence occurs between said digitally encoded, cyclically repeating signal and the number held in said memory whereby the phases of said notch edges within said cycle portion are varied oppositely by increments as a function of the value of said control signal thereby to obtain preselected effective A.C. output voltage.

12. Apparatus as set forth in claim 11 wherein, at a relative low preselected output voltage, each half cycle of said waveform has three notches, one of which is centered on the half cycle and the other two of which are symmetrically disposed on opposite sides of the one, and wherein said voltage control apparatus includes means for eliminating the two symmetrical notches when the number held in said memory exceeds a first predetermined number and for eliminating all three notches when the number held in said memory exceeds a second predetermined number which is higher than said first predetermined number.

References Cited

UNITED STATES PATENTS

| | | | |
|---|---|---|---|
| 3,324,374 | 6/1967 | Corey | 321—5 |
| 3,324,376 | 6/1967 | Hunt | 321—9 |
| 3,346,794 | 10/1967 | Stemmler | 321—9 X |
| 3,423,662 | 1/1969 | Schlabach et al. | 321—9 X |
| 3,443,196 | 5/1969 | Horner | 321—9 X |
| 3,453,524 | 7/1969 | Dinger | 318—227 X |

J D MILLER, Primary Examiner

W. H. BEHA, JR., Assistant Examiner

U.S. Cl. X.R.

318—227; 321—9